(12) United States Patent
Jia et al.

(10) Patent No.: US 11,108,490 B2
(45) Date of Patent: Aug. 31, 2021

(54) SYSTEMS AND METHODS FOR CARRIER PHASE RECOVERY

(71) Applicant: CABLE TELEVISION LABORATORIES, INC, Louisville, CO (US)

(72) Inventors: Zhensheng Jia, Superior, CO (US); Junwen Zhang, Broomfield, CO (US); Mu Xu, Broomfield, CO (US); Haipeng Zhang, Broomfield, CO (US); Luis Alberto Campos, Superior, CO (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/738,831

(22) Filed: Jan. 9, 2020

(65) Prior Publication Data
US 2020/0235842 A1 Jul. 23, 2020

Related U.S. Application Data

(60) Provisional application No. 62/790,146, filed on Jan. 9, 2019.

(51) Int. Cl.
*H04J 14/06* (2006.01)
*H04B 10/61* (2013.01)
*H04B 10/67* (2013.01)

(52) U.S. Cl.
CPC ............ *H04J 14/06* (2013.01); *H04B 10/612* (2013.01); *H04B 10/6162* (2013.01); *H04B 10/677* (2013.01)

(58) Field of Classification Search
CPC ... H04J 14/06; H04B 10/614; H04B 10/6165; H04B 10/6166
See application file for complete search history.

(56) References Cited

U.S. PATENT DOCUMENTS

| | | | | |
|---|---|---|---|---|
| 2011/0274436 A1* | 11/2011 | McNicol | ............ | H04B 10/5055 398/140 |
| 2012/0002979 A1* | 1/2012 | Xie | .................... | H04B 10/6162 398/208 |
| 2013/0089342 A1* | 4/2013 | Oveis Gharan | .... | H04B 10/6165 398/208 |
| 2016/0315714 A1* | 10/2016 | Awadalla | ............ | H04L 27/3836 |

\* cited by examiner

*Primary Examiner* — Nathan M Cors
(74) *Attorney, Agent, or Firm* — Armstrong Teasdale LLP

(57) ABSTRACT

A digital receiver is configured to process a polarization multiplexed carrier from a communication network. The polarization multiplexed carrier includes a first polarization and a second polarization. The receiver includes a first lane for transporting a first input signal of the first polarization, a second lane for transporting a second input signal of the second polarization, a dynamic phase noise estimation unit disposed within the first lane and configured to determine a phase noise estimate of the first input signal, a first carrier phase recovery portion configured to remove carrier phase noise from the first polarization based on a combination of the first input signal and a function of the determined phase noise estimate, and a second carrier phase recovery portion configured to remove carrier phase noise from the second polarization based on a combination of the second input signal and the function of the determined phase noise estimate.

19 Claims, 11 Drawing Sheets

SYSTEMS AND METHODS FOR CARRIER PHASE RECOVERY

CROSS REFERENCE TO RELATED APPLICATIONS

This application claims the benefit of and priority to U.S. Provisional Patent Application Ser. No. 62/790,146, filed Jan. 9, 2019, which is incorporated herein by reference in its entirety.

BACKGROUND

The field of the disclosure relates generally to communication networks, and more particularly, to access networks capable of digitally processing carrier signals for point-to-point (P2P) and point-to-multipoint (P2MP) communication systems.

Access networks, driven by ever-increasing residential data service growth rates and numbers of supported services types (e.g., business services, cellular connectivity, etc.), have been undergoing frequent technological and architectural changes. High-speed data and video service bandwidth requirements for the access paradigm are expected to grow to multi-gigabits-per-second (Gb/s) for residential offerings, and over 10-Gb/s for business markets in optical access networks of the near-future. At present, 10-Gb/s passive optical networks (PONs), such as XG-PON or IEEE 10G-EPON, are rapidly being deployed for high-bandwidth applications. 40-Gb/s PONs, based on time and wavelength division multiplexing (TWDM), have been standardized, and the IEEE 802.3ca Task Force is considering 100-Gb/s Ethernet PONs utilizing 25-Gb/s data rate per lane. However, PONs and access optical systems supporting greater than 50 Gb/s per channel have not been conventionally adopted because present direct detection optical schemes do not achieve sufficient power budgets due to their low receiver sensitivity and limited options for long-term upgrading. These direct detection challenges are particularly prevalent in the legacy fiber environment, where network operators desire the continued use of existing infrastructures to avoid costly fiber re-trenching.

Coherent optics technology is becoming common in the subsea, long-haul, and metro networks, but has not yet been applied to access networks due to the relatively high cost of the technology for such coherent implementations. The coherent optical technology approach is different from the direct detection approach, and enables superior receiver sensitivity that allows for an extended power budget. The high frequency selectivity of the coherent approach enables closely spaced dense or ultra-dense WDM, but without requiring narrow band optical filters. Moreover, the multi-dimensional recovered coherent signal provides additional benefits to compensate for the linear transmission impairments such as chromatic dispersion (CD) and polarization mode dispersion (PMD), and efficiently utilize the spectral resource and benefiting future network upgrades through the use of multi-level advanced modulation formats.

Commercial coherent optical technology was first introduced in long haul applications to overcome fiber impairments that required complex compensation techniques when using direct detection receivers. These first-generation coherent optical systems are based on a single-carrier polarization division multiplexed quadrature phase shift keying (PDM-QPSK) modulation format, and the achieved spectral efficiency (SE) is 2 bit/s/Hz greater than that of conventional 50-GHz optical grids. The system capacity according to the conventional approach is thus increased to approximately 10 Tb/s in the fiber C-band transmission window.

Coherent solutions have recently migrated from long haul, to metro and access networks, by leveraging the development of CMOS digital signal processing (DSP) techniques, reductions in design complexity, and decreases in the price opto-electronic components. Whereas coherent technology in long-haul optical systems utilize best-in-class discrete photonic and electronic components (e.g., the latest digital-to-analog/analog-to-digital converters (DAC/ADC) and DSP application specific integrated circuits (ASICs) based on the most recent CMOS processors), coherent pluggable modules for metro solutions have gone through C Form-factor pluggable (CFP) to CFP2 and future CFP4 via multi-source agreement (MSA) standardization for a smaller footprint, lower cost, and lower power dissipation.

This metro solution, however, is nevertheless considered in the field to be over-engineered, and also too expensive, large, and power-demanding to be efficiently and practically implemented in the access paradigm, which is a significantly different environment than the long haul and metro environments. The shorter transmission reach of the access network results in less distance-dependent signal degradation, and therefore requires less link equalization (e.g., fewer digital filter taps) and less processing in the DSP ASIC for impairment compensation. Such shorter-reach access applications additionally tolerate a slight reduction in optical signal-to-noise-ratio (OSNR) performance. Nevertheless, conventional DSP techniques and algorithms are unable to meet the size and cost requirements for access applications in developing and future access networks. Accordingly, it is desirable to develop DSP processing schemes for the access network paradigm that are able to reduce the DSP complexity and power consumption thereof.

SUMMARY

In an embodiment, a digital receiver is configured to process a polarization multiplexed carrier from a communication network. The polarization multiplexed carrier includes a first polarization and a second polarization. The receiver includes a first lane for transporting a first input signal of the first polarization, a second lane for transporting a second input signal of the second polarization, a dynamic phase noise estimation unit disposed within the first lane and configured to determine a phase noise estimate of the first input signal, a first carrier phase recovery portion configured to remove carrier phase noise from the first polarization based on a combination of the first input signal and a function of the determined phase noise estimate of the first input signal, and a second carrier phase recovery portion configured to remove carrier phase noise from the second polarization based on a combination of the second input signal and the function of the determined phase noise estimate of the first input signal.

In an embodiment, a method is provided for performing carrier phase recovery on a polarization multiplexed carrier in a digital signal processor of a coherent optics receiver. The method includes steps of dynamically estimating phase noise of a first polarization direction of the polarization multiplexed carrier to generate a single-polarization phase noise estimate from the first polarization direction, and performing phase recovery for a second polarization direction of the polarization multiplexed carrier based on the single-polarization phase noise estimate from the first polarization direction.

BRIEF DESCRIPTION

These and other features, aspects, and advantages of the present disclosure will become better understood when the following detailed description is read with reference to the accompanying drawings in which like characters represent like parts throughout the drawings, wherein.

Figure 8:
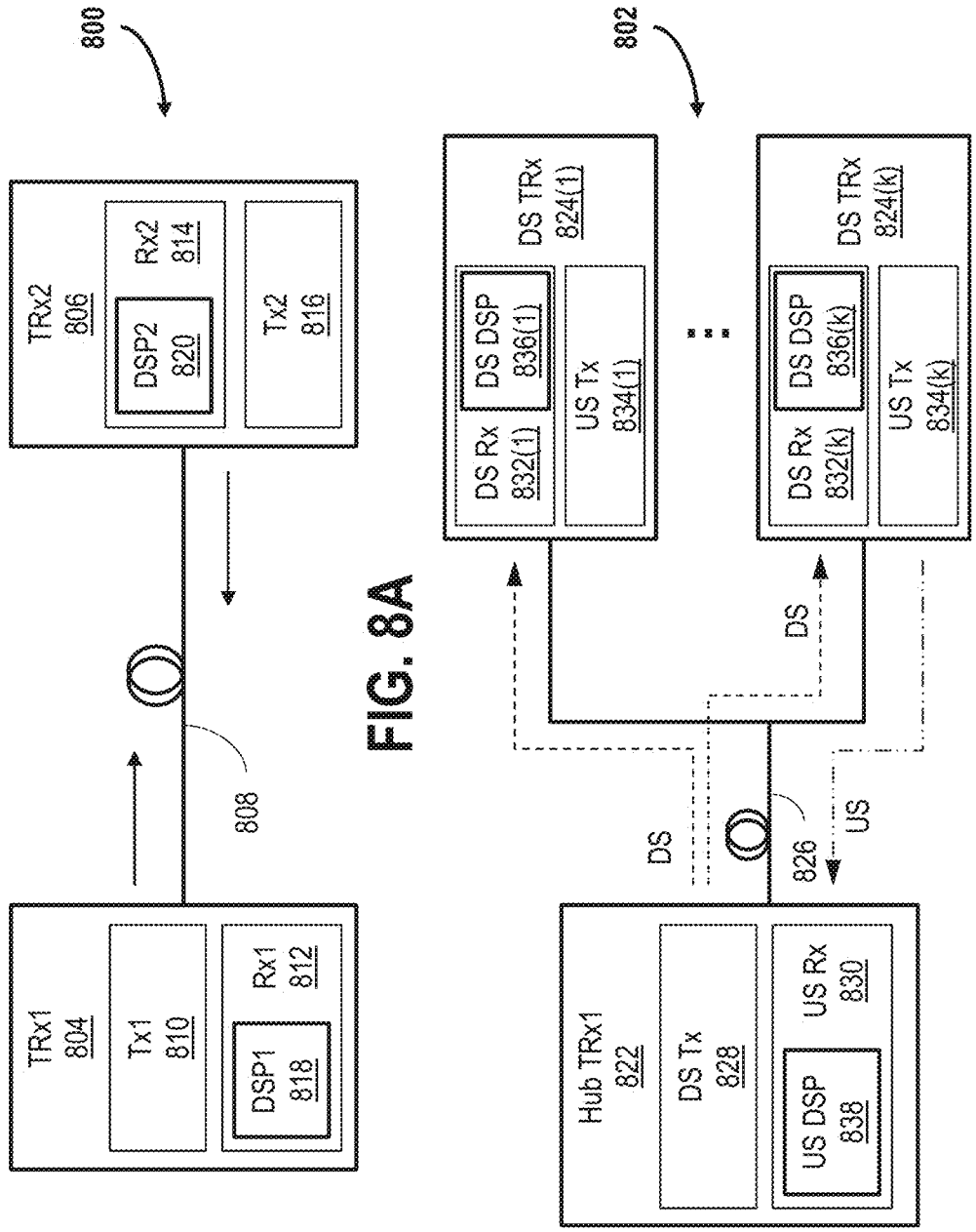

FIGS. 8A-B are schematic illustrations depicting exemplary optical network architectures.

Figure 9:
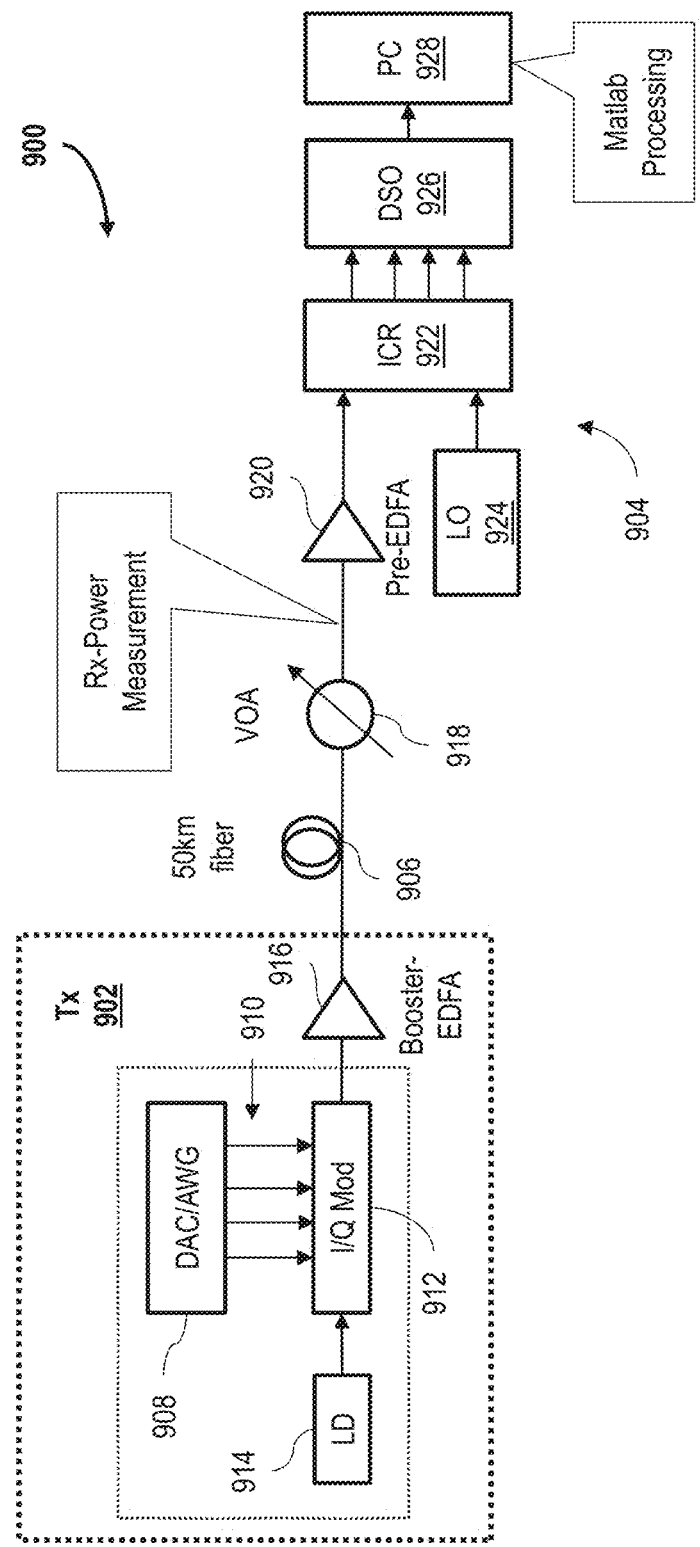

FIG. 9 is a schematic illustration of an exemplary test architecture for verifying experimental results implementing the receiver processing embodiments herein.

Figure 10A:
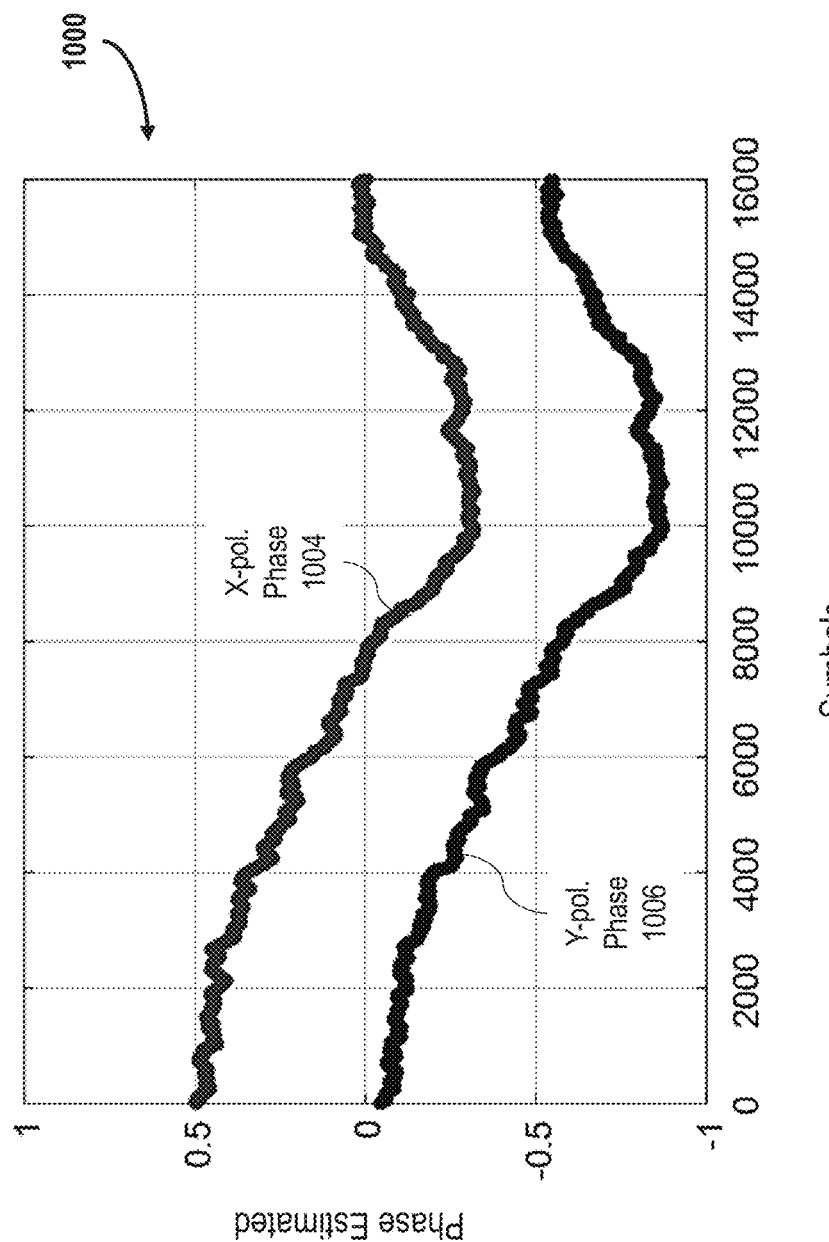
Figure 10B:
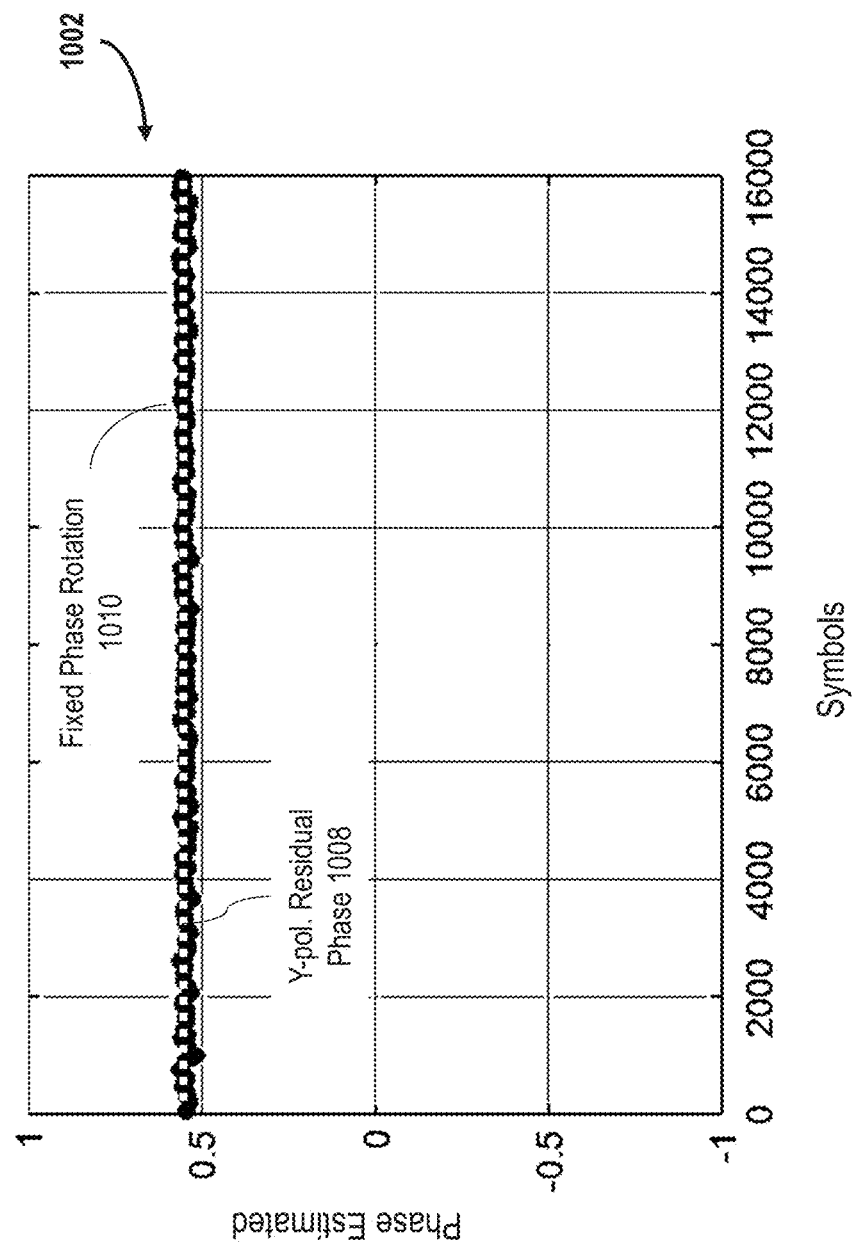

FIG. 10A-B are graphical illustrations depicting experimental phase estimation result plots obtained according to the test architecture depicted in FIG. 9.

Figure 11A:
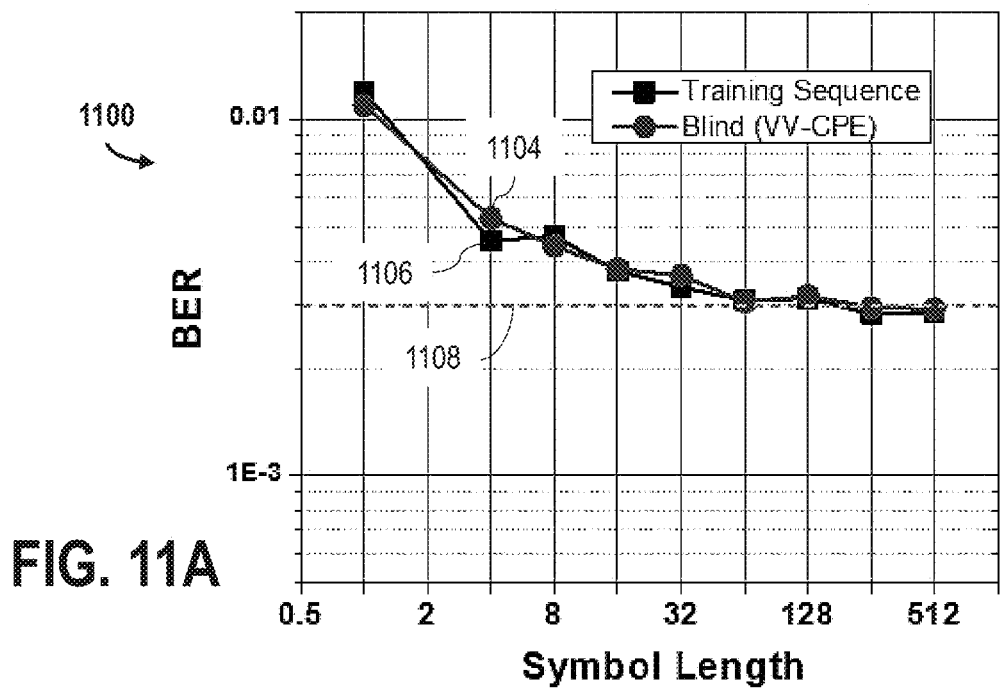
Figure 11B:
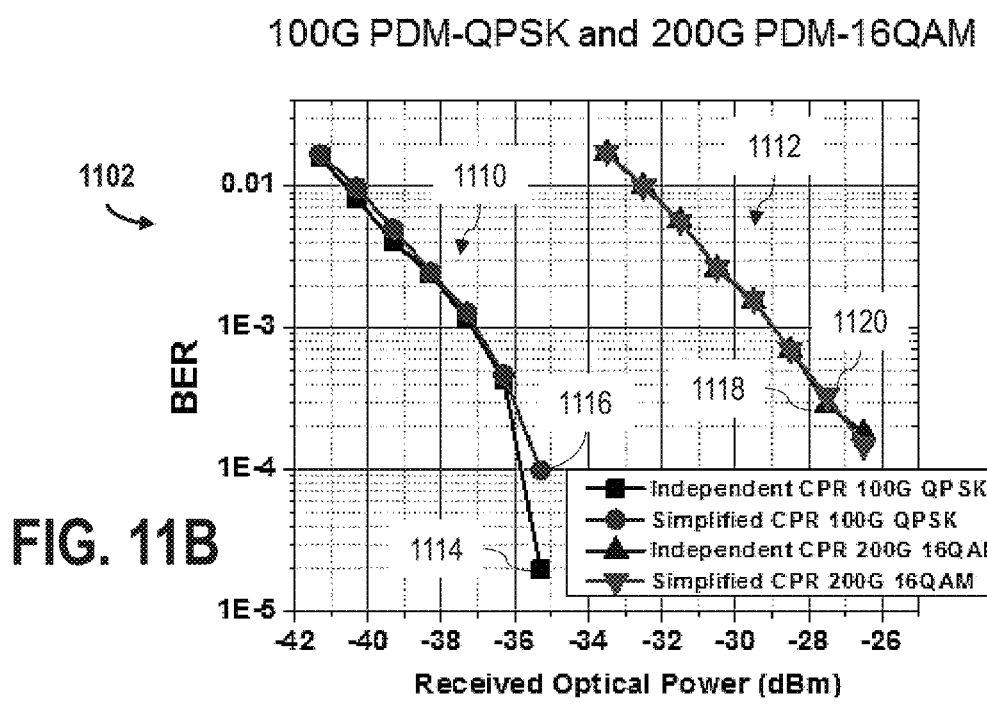

FIG. 11A-B are graphical illustrations depicting comparative bit-error-ratio performance result plots obtained according to the test architecture depicted in FIG. 9.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "transceiver," unless specified otherwise, refers to a P2P coherent optics transceiver, having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The embodiments described herein provide innovative access network architectures and processes that are useful for achieving simplified carrier phase recovery (CPR) for polarization multiplexed coherent optics in access network applications. In an exemplary embodiment, the present systems and methods leverage coherent optics technologies, and with respect to P2P or P2MP systems and communication links, to significantly improve the cable access network paradigm by reducing the cost, complexity, and power consumption from DSP on a received optical carrier.

In an embodiment, a CPR algorithm is implemented in three DSP steps or subprocesses for one or more single polarization signals: (1) a one-tap state-of-polarization (SoP) estimation/polarization demultiplexing step; (2) a training sequence (TS)-based frequency offset estimation (FOE)/compensation step; and (3) a digital filtering step (e.g., using two digital filters) for channel equalization. The output of the estimated carrier phase and noise from one polarization direction (e.g., X-polarization) may then be used for the signals from the other polarization direction (e.g., Y-polarization) and combined with an estimated fixed phase offset rotation between the two polarizations.

In another embodiment, the communication network includes a differential coded coherent system, such as polarization multiplexed differential quadrature phase shift keying (PM-DQPSK). In this embodiment, a fixed phase offset between the two polarizations is not required, thereby further reducing the total DSP complexity, which enables a significantly more hardware-efficient coherent optical system for the access network.

The following embodiments are described with respect to receivers operating at 100 and 200 Gb/s. However, the person of ordinary skill in the art will appreciate that such operating parameters are described by way of example, and not in a limiting sense. The principles herein are applicable to access networks, PONs, and coherent optics systems operating at different transmission speeds, and particularly as the demand for increased speed and bandwidth continues to grow. The following examples are also described with respect to exemplary fiber links of approximately 50 km. However, the person of ordinary skill in the art will further appreciate that the present techniques support links of up to 80 km, 120 km, or greater in some circumstances.

Figure 1:
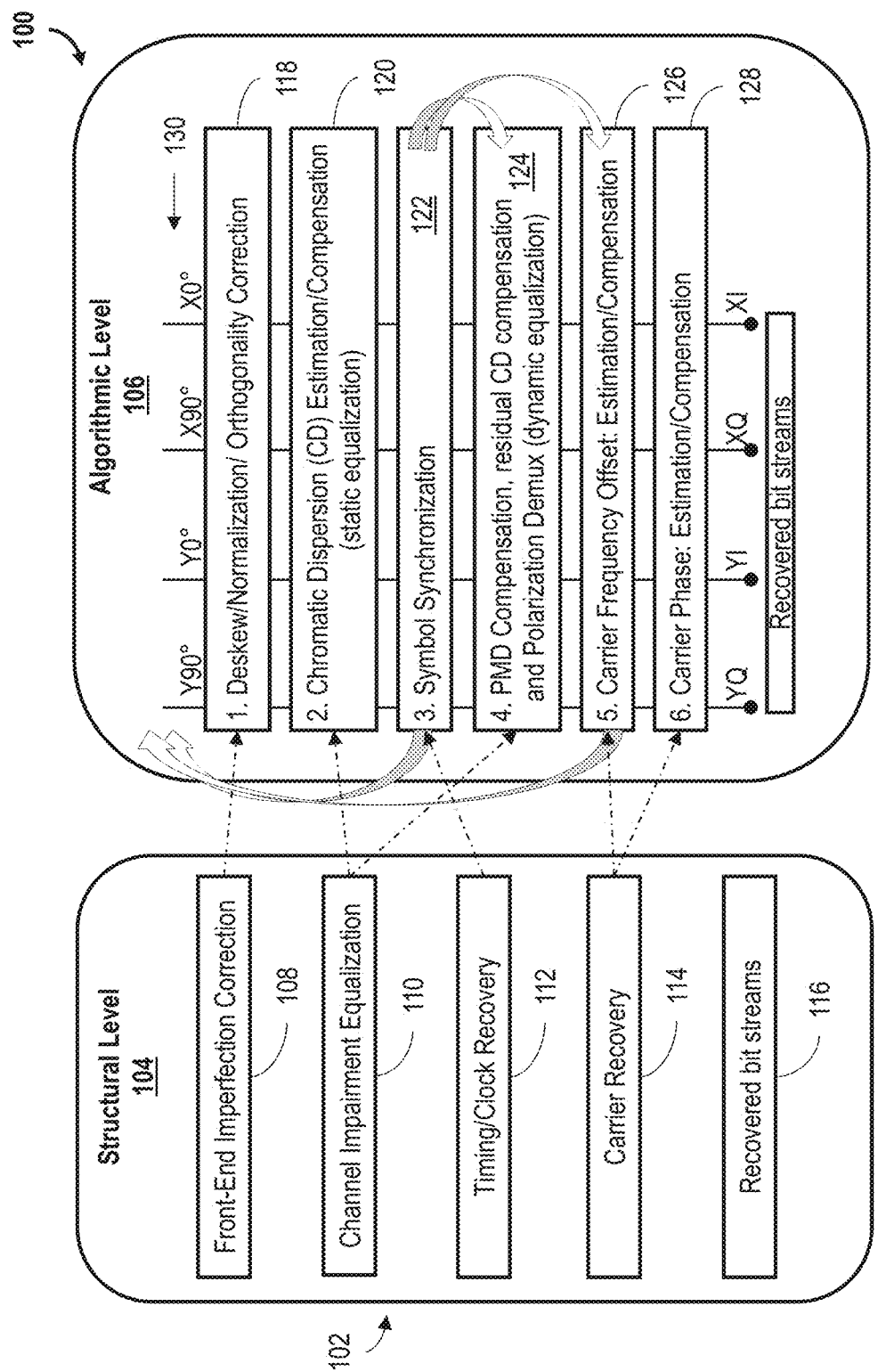
FIG. 1 depicts a digital signal processing flow of a receiver processor.

FIG. 1 depicts a DSP flow 100 of a receiver processor 102. In an exemplary embodiment, receiver processor 102 is a digital coherent optical receiver and DSP flow 100 illustrates the DSP functionality for a polarization multiplexed signal with respect to a structural level 104 and an algorithmic level 106 of processor 102. In an exemplary embodiment, the polarization multiplexed signal may be a dual-polarization (e.g., X/Y) in-phase/quadrature (I/Q) quadrature amplitude modulation (QAM, or PM-QAM) carrier signal. The structural and algorithmic functionality of the coherent optical receiver is described in further detail in co-pending U.S. patent application Ser. No. 16/370,873, filed Mar. 29, 2019, the subject matter of which is incorporated herein by reference.

Structural level 104 may, for example, include one or more of: a first block 108 for compensation of front-end imperfections; a second block 110 for channel impairment equalization and compensation of major channel transmission impairments; a third block 112 for timing and clock recovery; a fourth block 114 for carrier recovery; and a fifth block 116 for bit stream recovery. Algorithmic level 106 may, for example, include one or more of: a first module 118 for deskewing, normalization, and/or orthogonality correction; a second module 120 for chromatic dispersion (CD) estimation or compensation (e.g., static equalization); a third module 122 for symbol synchronization; a fourth module 124 for PMD compensation, residual CD compensation, and/or polarization demultiplexing (e.g., dynamic equalization); a fifth module 126 for estimation and/or compensation of carrier frequency offset; and a sixth module 128 for carrier phase estimation (CPE) and/or compensation.

In exemplary operation of DSP flow 100, four digitized signals 130 (i.e., I and Q components for each X and Y polarization) are passed through first block 108 (i.e., in digital form, for example, after conversion by an ADC) to compensate front-end imperfections. Such front end imperfections may be compensated by one or more correction algorithms of first module 118, which may include a deskew algorithm to correct the timing skew between the four channels resulting from the difference in both optical and electrical path lengths within the coherent receiver, normalization and orthogonality correction algorithms, and/or algorithms to compensate for differences between the respective output powers of the four channels (due to different responses of PINs and/or transimpedance amplifiers (TIAs) in the receiver), as well as quadrature imbalances resulting from a particular optical hybrid not exactly introducing a 90-degree phase shift.

In further operation of DSP flow 100, major channel transmission impairments may be compensated through use of appropriate digital filters of second block 110, which may, through second module 120, utilize estimation and compensation algorithms to address impairments such as CD and PMD. Second module may further include algorithms for performing, based on the different time scales of the dynamics of the respective impairments, static equalization for CD compensation because of its independence of SoP and modulation format, as well as the impact on subsequent blocks of structural level 102 before the CD estimation may be needed to achieve accurate compensation.

At third block 112, clock recovery for symbol synchronization may be processed within structural level 102 to track the timing information of incoming samples, for example, using third module 122. In an embodiment, joint processing between third block 112 and fourth module 124 may be performed to achieve symbol synchronization within algorithmic level 104 after all channel impairments are equalized (e.g., as represented by respective arrows indicated in FIG. 1). In at least one embodiment, a fast-adaptive equalization subprocess may be jointly performed for two polarizations within fourth module 124 through a butterfly structure and stochastic gradient algorithms, such as a constant modulus algorithm (CMA) and variants thereof. Fourth module 124 may further include one or more additional algorithms for further PMD compensation, residual CD compensation, and/or polarization demultiplexing (e.g., dynamic equalization).

At fourth block 114, carrier recovery is performed in cooperation with fifth module 126, which may include one or more algorithms to perform carrier frequency offset estimation or compensation. In an embodiment, fifth module 126 may further include algorithms configured to estimate, and then remove, the frequency offset between a source laser (not shown in FIG. 1) and a local oscillator (LO), to prevent the constellation rotation at the intradyne frequency. Within sixth module 128, algorithms may be configured such that the carrier phase noise may be estimated and removed from the modulated signal, which may further include algorithms for symbol estimation and hard or soft-decision forward error correction (FEC) for channel decoding. At fifth block 116, the final bit streams may be recovered at both structural level 104 and algorithmic level 106.

It may be noted that, for a particular digital coherent receiver, the ordering of blocks and modules for DSP flow 100 may, according to design choices at the receiver, differ from the order described above. For example, instead of, or in addition to, a feed-forward process, joint processing and feedback among different process blocks may be performed, including without limitation, clock recovery and polarization demultiplexing.

In some embodiments, a coherent receiver may include fewer, or additional, blocks and/or modules than those described herein. For example, an alternative algorithmic level architecture is described below with respect to FIG. 2. In other embodiments, similar functionality may be achieved through use of training sequences, data-aided, or blinded algorithms, as described further below with respect to FIGS. 3-7.

Coherent detection and DSP technologies have thus been key factors enabling the development of 100 G coherent optical transmission systems. DSP technology has played in even more ubiquitous role, at both the transmitter and receiver, and the development of 200 G coherent optical systems, and this trend is expected to continue in the development of further next-generation coherent optical systems. Although specific algorithms may be different for each block or module of the DSP, general functionality at the structural level (e.g., structural level 104) or functional abstractions (e.g., algorithmic level 106) are expected to be similar for relevant commercial products implementing such technology.

Figure 2:
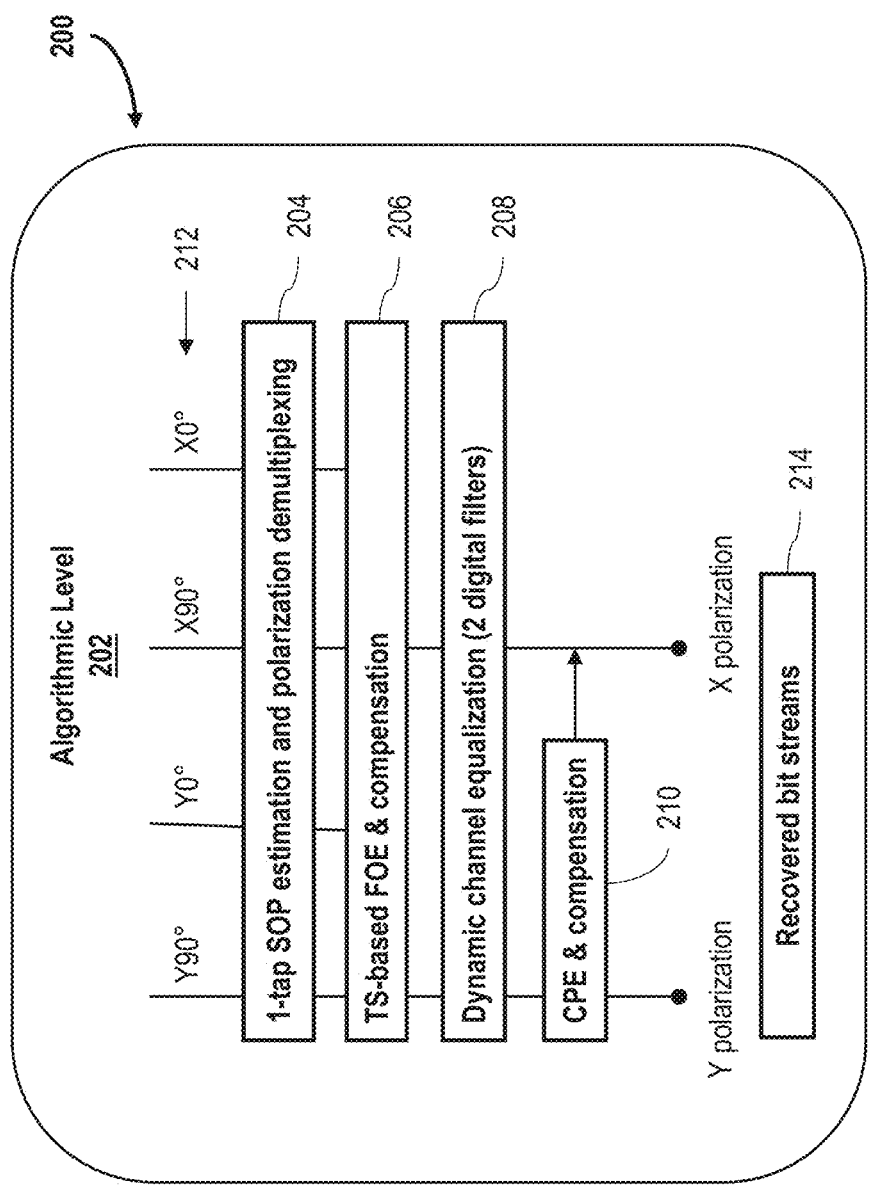
FIG. 2 depicts an exemplary digital signal processing flow in an algorithmic level of the receiver processor depicted in FIG. 1.

FIG. 2 depicts an exemplary DSP flow 200 in an algorithmic level 202 of receiver processor 102, FIG. 1. In an exemplary embodiment, algorithmic level 202 replaces algorithmic level 106, FIG. 1, within receiver processor 102. In some embodiments, algorithmic level 202 may include one or more algorithms, modules, or subprocesses of algorithmic level 106 in a complementary fashion.

In the exemplary embodiment, algorithmic level 202 may, for example, include one or more of: a first module 204 for performing SoP estimation and polarization demultiplexing (e.g., 1-tap); a second module 206 for performing training sequence (TS)-based FOE and compensation; a third module 208 for performing dynamic channel equalization (e.g., two digital filters); and a fourth module 210 for performing carrier phase estimation (CPE) and compensation.

In exemplary operation of DSP flow 200, first module 204 and second module 206 are all configured to functionally process all four of digitized signals 212 for the respective I/Q components of the X/Y polarizations, similar to the various respective modules of algorithmic level 106. In the embodiment depicted in FIG. 2 though, third module 208 may be configured to functionally process one component 212 from each polarization (e.g., YQ and XQ signals 212, in this example). The operational functionality of first module 204, second module 206, and third module 208 is otherwise described in greater detail in co-pending U.S. application Ser. No. 16/412,104, filed May 15, 2019, the subject matter thereof which is incorporated by reference herein.

Although similar in functional operation, fourth module 210 particularly differs from sixth module 128, FIG. 1, in that whereas sixth module 128 is configured to perform carrier phase estimation and compensation on all four signals 130 (i.e., the I/Q components of both X/Y polarizations), fourth module 210 is configured such that carrier phase estimation/compensation need be performed on one of only the I/Q components of one of the two polarizations (e.g., the YQ signal 212, in the example depicted in FIG. 2). That is, DSP flow 200 represents a significantly simplified algorithmic DSP flow in the digital optical coherent receiver for the optical access network, in comparison with algorithmic level 106 of DSP flow 100, FIG. 1. Accordingly, the following DSP embodiments are described with particular focus on the innovative simplified DSP techniques of fourth module 210 that produces recovered bit streams 214 for both X and Y polarizations, but through performance of CPE on only one such polarization signal 212.

According to the innovative embodiments described herein, the complexity of the DSP flow in the receiver processor is advantageously reduced such that the processor need not implement fixed CD compensation. Instead, as illustrated in the embodiment depicted in FIG. 2, the accumulated CD in the access network may be alternatively compensated within third module 208 (i.e., dynamic channel equalization). Moreover, the complexity of DSP flow 200 is still further reduced, in comparison with DSP flow 100 or conventional techniques, by the performance of adaptive polarization demultiplexing and PMD compensation with multiple taps in a single processing block/module, namely, first module 204. That is, a single tap is employed for SoP tracking and polarization demultiplexing prior to channel equalization (e.g., an third module 208). By separating these two functional blocks/modules within DSP flow 200, single polarization equalization may be achieved with two digital finite impulse response (FIR) filters, as opposed to conventional systems that implement a butterfly-based bank configuration with four FIR filters and crossing computation.

Thus, in comparison with conventional techniques, systems and methods according to the "simplified" configuration of DSP flow 200 are capable of reducing the DSP computational complexity by 50% for adaptive equalization functionality. In an exemplary embodiment of DSP flow 200, TS-based frequency-offset estimation and compensation may be further achieved (e.g., through implementation of second module 206) using a training sequence having an optimized length with respect to the single-polarization signals, or with respect to the average of the dual-polarization signals. Accordingly, after frequency offset correction (e.g., second module 206) and channel equalization (e.g., third module 208) accomplished, carrier phase recovery (CPR) may then be achieved at, or by implementation of, fourth module 210.

Figure 3:
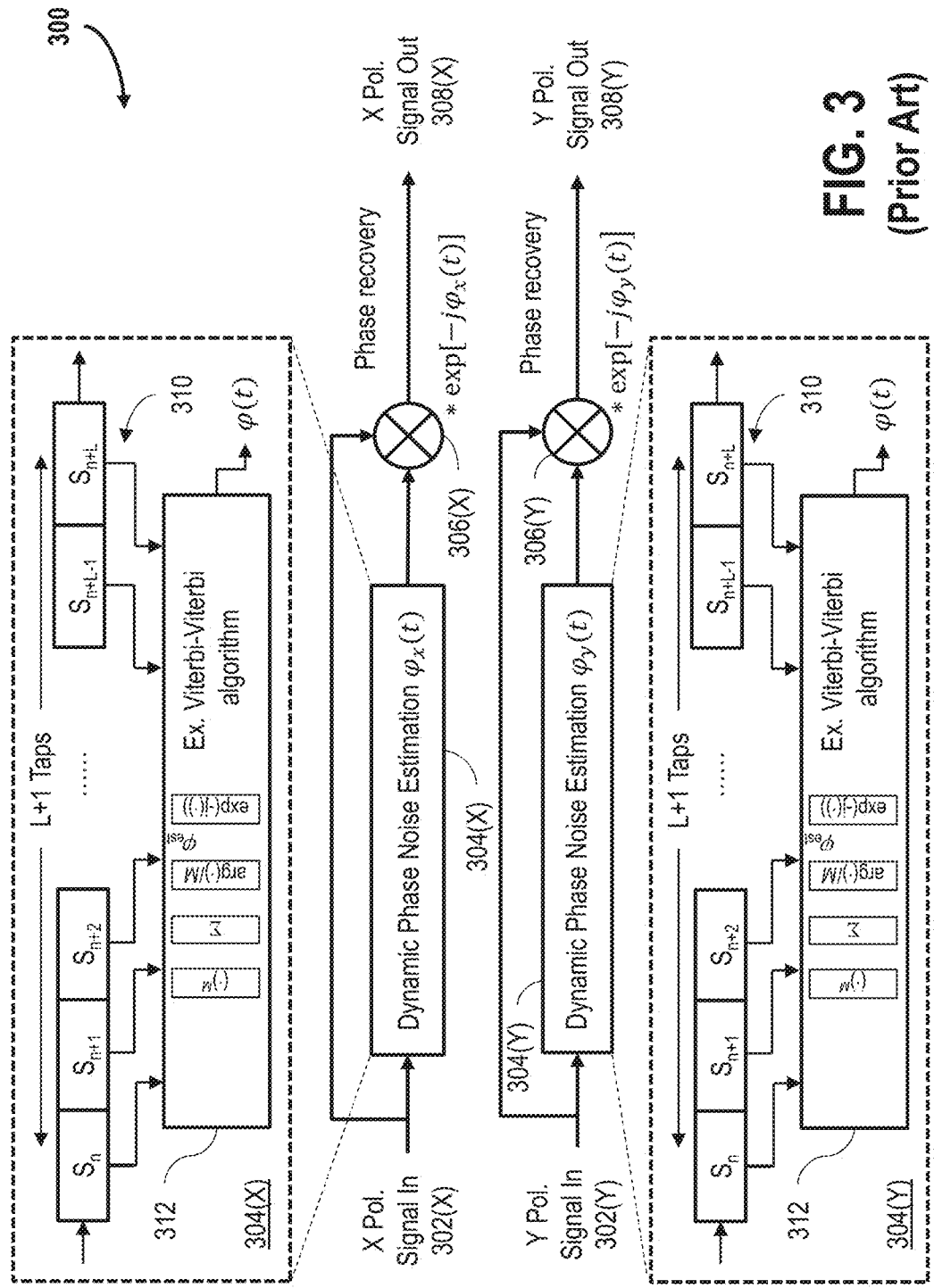
FIG. 3 is a schematic illustration depicting a conventional carrier phase recovery process for a dual-polarization carrier by a receiver processor.

FIG. 3 is a schematic illustration depicting a conventional CPR process 300, for a dual-polarization carrier input signal 302, by a receiver processor (not separately shown). For each single polarization of input signal 302 (i.e., 302(X) and 302(Y)), process 300 passes the original input signal 302 through a respective dynamic phase noise estimation unit 304. An output of unit 304 is then combined, at a respective mixer 306, with the original input signal 302 to achieve phase recovery and generate an output signal 308 for the respective single X- or Y-polarization of the dual-polarization carrier. In this example, unit 304 includes a plurality of taps 310 and a phase estimation module 312. Phase estimation module 312 implements, for example, a Viterbi-Viterbi (VV) CPR algorithm or a blind-phase-search (BPS) algorithm to obtain the phase estimate, $\varphi(t)$, for the respective single-polarization such that mixer 306 achieves phase recovery through a function $e^{-j\varphi(t)}$ based on that phase estimate (i.e., $e^{-j\varphi_x(t)}$ for the X-polarization and $e^{-j\varphi_y(t)}$ for the Y-polarization).

In further operation of conventional CPR process 300, dynamic phase noise estimation unit 304 includes L+1 taps 310 for L-tap symbols S. The symbols S are used for phase estimation of the center symbol $S_{n+L/2}$, based on, for example, a $4^{th}$ power VV CPR or BPS algorithm. In the case where input signal 302 is a QPSK signal having four phase states, the received complex symbols of the QPSK signal are first raised to the $4^{th}$ power to remove modulation, leaving only the phase noise present. Center symbol $S_{n+L/2}$ is then added to N predecessors and successors to average the estimated phase. In conventional CPR process 300, because the phase varies over a range of $2\pi$, the estimated phase must be "unwrapped" to provide a continuous and unambiguous phase estimation. After the phase unwrapping, estimated phase error compensation is performed with respect to the received complex symbols.

Again, and as illustrated in the example depicted in FIG. 3, conventional CPR process 300 requires that the processing for phase estimation is performed independently for each of the X-polarization and the Y-polarization signals. These conventional techniques, therefore, require considerable processing resources for complex dual-polarization signals, which presents particular challenges to the implementation of DSP processing in the developing near-future access network paradigm. An innovative solution to these challenges is described further below with respect to FIG. 4.

Figure 4:
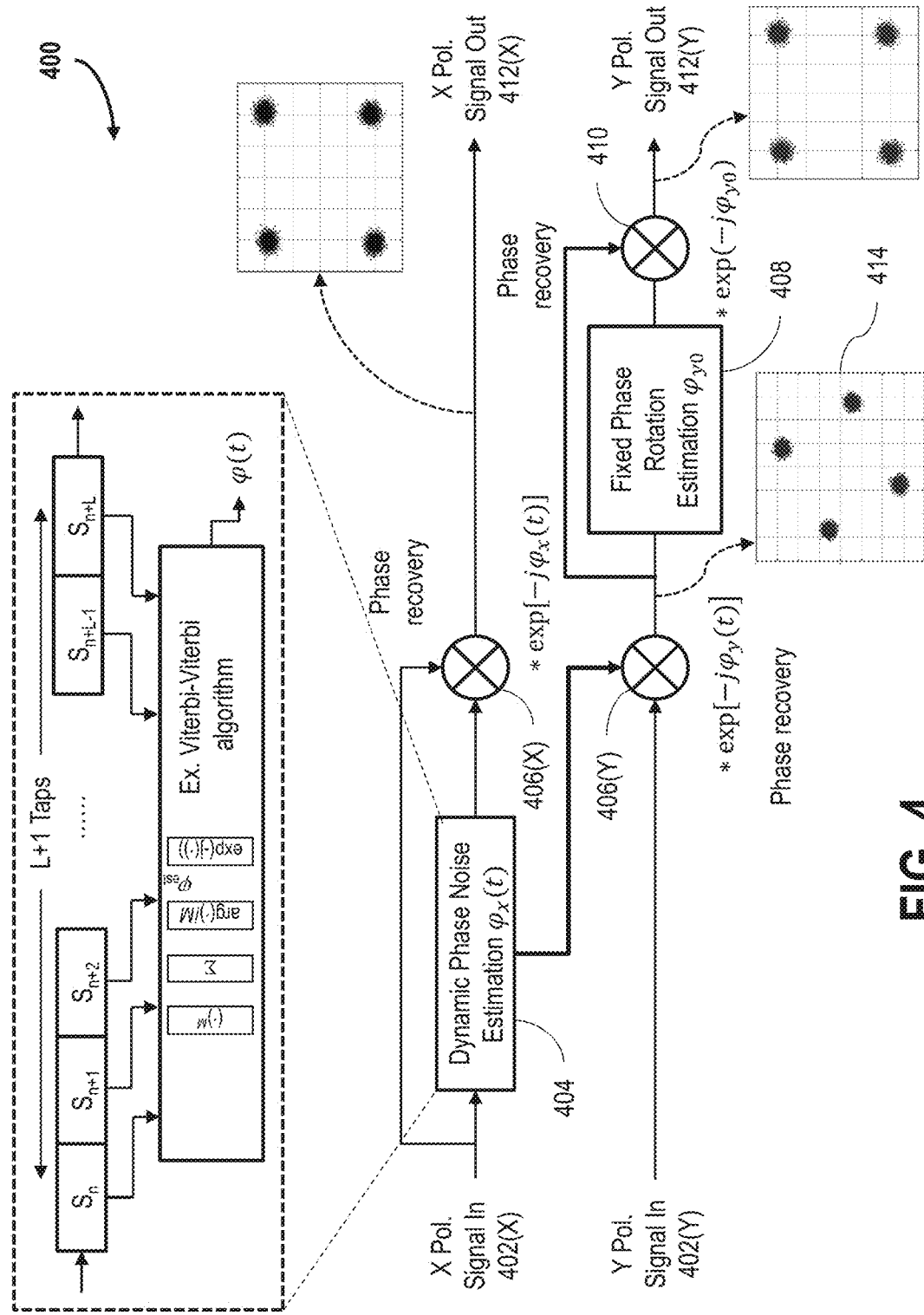
FIG. 4 is a schematic illustration depicting an exemplary carrier phase recovery process for a dual-polarization carrier by a receiver processor, in accordance with an embodiment.

FIG. 4 is a schematic illustration depicting an exemplary CPR process 400 for performing carrier phase recovery and compensation on a dual-polarization carrier input signal 402 by a receiver processor (e.g., processor 102, FIG. 1). CPR process 400 is architecturally similar, in some respects, to conventional CPR process 300, FIG. 3. CPR process 400 differs though, from conventional CPR process 300 in that CPR process 400 utilizes a single dynamic phase noise estimation unit 404 for both of the X-polarization and the Y-polarization portions (i.e., input signals 402(X) and 402(Y), respectively) of input signal 402. In an exemplary embodiment, unit 404 may be similar in structure and functionality to dynamic phase noise estimation unit 304, FIG. 3, and similarly processes only a single-polarization input signal 402 (e.g., input signal 402(X), in this example). Different from unit 304, however, unit 404 outputs to both of two dynamic mixers 406(X) and 406(Y) for the two polarizations, respectively. Dynamic mixers 406(X) and 406(Y) may be otherwise similar to respective mixers 306 (X) and 306(Y), FIG. 3.

CPR process 400 further differs from conventional CPR process 300 in that CPR process 400 may include, for the other single-polarization lane (e.g., Y-polarization, in this example), a fixed phase rotation estimation unit 408 and a fixed mixer 410 configured to receive an output from unit 408. More specifically, dynamic mixer 406(X) combines single-polarization input signal 402(X) with an output of single-polarization dynamic phase noise estimation unit 404 (e.g., $\varphi_x(t)$-based, in this example). Thus, in the example depicted in FIG. 4, phase recovery for an X-polarization output signal 412(X) is thereby achieved from dynamic mixer 406(X) through the function $e^{-j\varphi_x(t)}$.

In contrast, dynamic mixer 406(Y) combines single-polarization input signal 402(Y) with the same $\varphi_x(t)$-based output of the single dynamic phase noise estimation unit 404. Since a phase recovery output 414 of mixer 406(Y) is based on the function $e^{-j\varphi_x(t)}$, output 414 will exhibit rotation with respect to X-polarization output signal 412(X). Accordingly, in the example depicted in FIG. 4, output 414 is passed through fixed phase rotation estimation unit 408, and the output of unit 408 (e.g., $\varphi_{y0}$-based) is then combined with output 414 at fixed mixer 410 to achieve phase recovery for a Y-polarization output signal 412(Y) through a function $e^{-j\varphi_{y0}}$ relating to unit 408. The person of ordinary skill in the art will understand, through comprehension of the present description and illustrations, that either polarization direction may be selected for processing through the single dynamic phase noise estimation unit.

Therefore, according to the innovative configuration of CPR process 400, a simplified and hardware-efficient DSP flow (e.g., DSP flow 200, FIG. 2) is accomplished. In an exemplary embodiment, CPR process 400 is accomplished in two stages: (1) phase noise estimation using only a single polarization direction; and (2) phase recovery for both polarization directions using the same single-polarization-based phase noise estimation. More particularly, phase noise estimation is performed in the first stage at only a single polarization direction, and this single-direction estimate for the first polarization signal is thus also shared with the second polarization signal to accomplish phase recovery for both polarizations in the second stage. In the exemplary embodiment, phase recovery of the second polarization signal may further utilize fixed phase rotation estimation and recovery through implementation of data-aided or blind estimation processes.

Thus, according to the present systems and methods, DSP processing for a dual-polarization carrier signal be effectively accomplished through performance of only one dynamic phase noise estimation processing stage for both polarizations of the dual-polarization signal. Dynamic phase noise estimation processing is time varying, with high computational complexity. The innovative configuration depicted in FIG. 4 advantageously reduces this computational burden and complexity by approximately half. Whereas the particular example for CPR process 400 described herein does include an additional fixed phase rotation estimation that is not performed in conventional CPR process 300, FIG. 3, this fixed phase rotation estimation is considered, in comparison with dynamic phase noise estimation, to be a one-time process having a relatively negligible computation complexity. An exemplary technique for performing fixed phase rotation estimation is described below with respect to FIG. 5.

Figure 5:
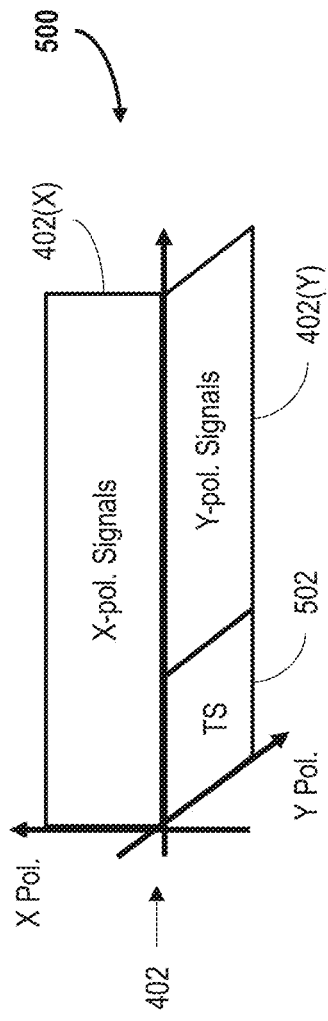
FIG. 5 is a graphical illustration depicting an exemplary fixed phase rotation estimation subprocess for the carrier phase recovery process depicted in FIG. 4.

FIG. 5 is a graphical illustration depicting an exemplary fixed phase rotation estimation subprocess 500 for CPR process 400, FIG. 4. In an exemplary embodiment, subprocess 500 may be implemented at fixed phase rotation estimation unit 408 for the second polarization direction that is not subject to dynamic phase noise estimation (i.e., through unit 404). Thus, according to the exemplary embodiment depicted in FIG. 4, because X-polarization input signal 402(X) and Y-polarization 402(Y) originate from the same carrier, subprocess 500 is able to advantageously leverage the relationship between these two signal portions to utilize a single dynamic estimation from only one signal polarization to achieve CPR for both signal polarizations. That is, even though the phase of the respective individual signal polarizations may change substantially in relation to one another (e.g., from multiple DSP stages on the individual polarization lanes), fixed phase estimation subprocess 500 may utilize one or more training sequences 502 in the second polarization signal (i.e., signal 402(Y), in this example) to achieve a TS-based estimate for phase recovery of the second polarization signal portion.

More particularly, and as illustrated in the example depicted in FIG. 5, a training sequence, Ts, is inserted into second input signal polarization 402(Y) to coincide with first input signal polarization 402(X). Thus, a given Ts 502 may be represented according to [Ts$_1$, Ts$_2$, Ts$_N$], where N represents the training length in the Y-polarization direction. In this manner, a received signal, Rs, at the X-polarization is [Rs$_1$, Rs$_2$, Rs$_N$], and may represent input signal 402(X), which may have been subject to FOE and channel equalization (e.g., from second module 206 and third module 208, respectively, FIG. 2), and after dynamic phase noise estimation (e.g., by dynamic phase noise estimation unit 404, FIG. 4). Using these values, subprocess 500 is able to determine the fixed phase rotation $\varphi_{y,0}$ according to:

$$\varphi_{y,0}=\text{avg}(\text{angle}(Rs/Ts))$$

Figure 6:
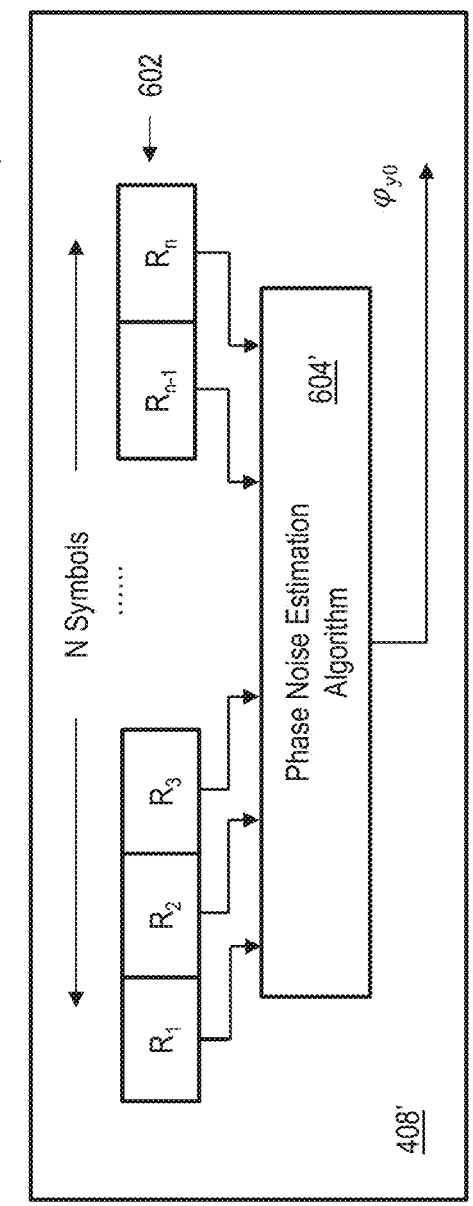
FIG. 6 is a graphical illustration depicting an alternative fixed phase rotation estimation subprocess for the carrier phase recovery process depicted in FIG. 4.

FIG. 6 is a graphical illustration depicting an alternative fixed phase rotation estimation subprocess 600 for CPR process 400, FIG. 4. In an exemplary embodiment, subprocess 600 may be implemented as an alternative to the implementation of TS-based fixed phase rotation estimation subprocess 500, FIG. 5, within or in conjunction with, an alternative embodiment of fixed phase rotation estimation unit 408', FIG. 4. In the exemplary embodiment, subprocess 600 represents a blind phase estimation processing technique useful to determine an estimate of the fixed phase rotation $\varphi_{y,0}$. That is, similar to the innovative technique described above with respect to FIG. 5, the fixed phase rotation $\varphi_{y,0}$ is still determined to achieve phase recovery for the second of the two single-polarization signals after dynamic phase noise estimation for only the first of the single-polarization input signals.

As depicted in the example illustrated in FIG. 6, a plurality of received symbols 602 (i.e., 1-N received symbols 602) are fed into and processed by an algorithm of a phase noise estimation unit 604, which in turn generates the fixed phase rotation estimation $\varphi_{y,0}$. That is, through this alternative subprocessing technique, the same fixed phase rotation estimation (i.e., $\varphi_{y,0}$) is obtained according to this blind phase estimation approach subprocess 600, as is obtained through implementation of training sequence-based subprocess 500. Both techniques fully support the simplified DSP flow approach described above with respect to FIGS. 2 and 4.

Although the blind phase estimation approach described with respect to FIG. 6 is similar, in some respects, to conventional blind phase recovery methods (e.g., BPS, or even VV). However, according to the innovative and simplified approach of subprocess 600, the sliding window that is necessary to the conventional approach, is no longer needed according to the blind phase estimation approach of subprocess 600. Indeed, according to subprocess 600 only a one-time phase estimation of the N symbols (R$_1$-R$_N$) is performed, and then the fixed phase rotation estimate $\varphi_{y,0}$ may be obtained by averaging these N symbols.

Figure 7:
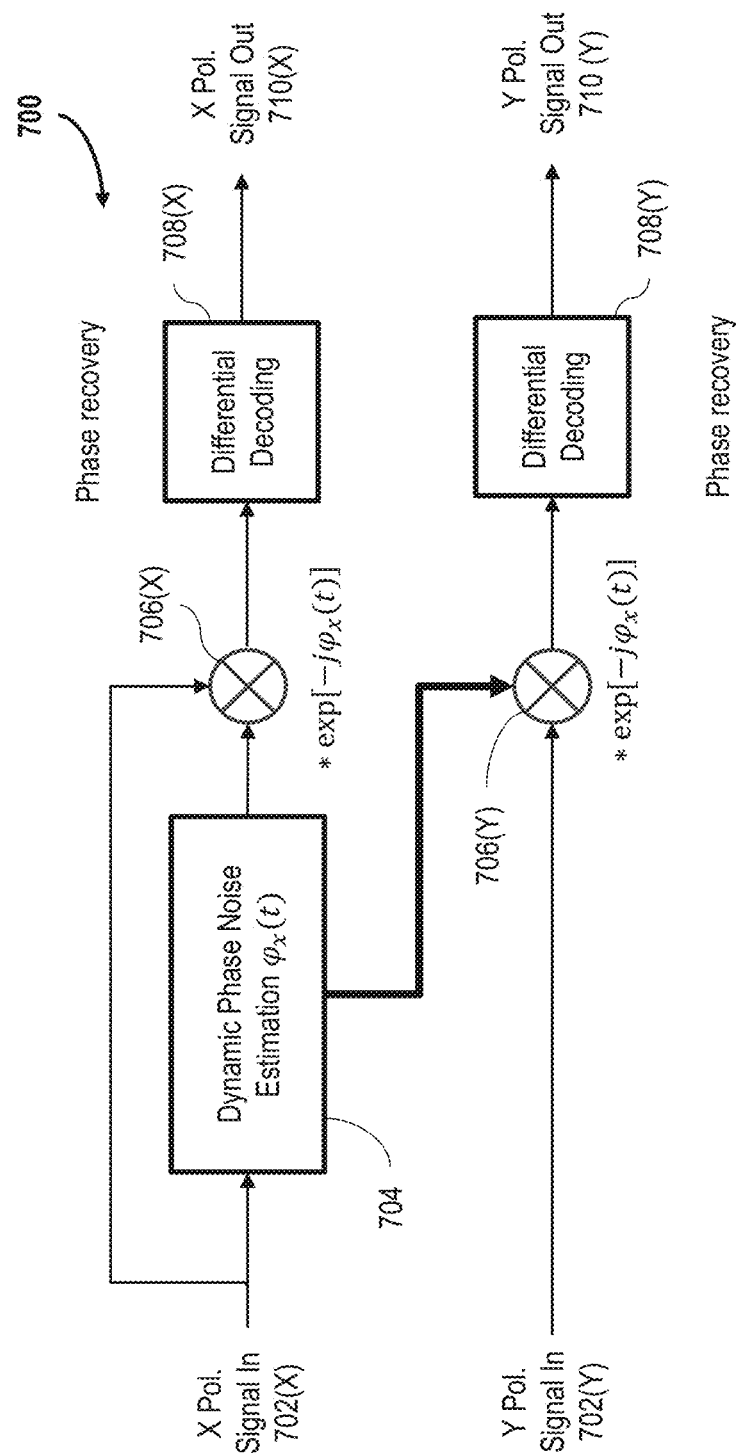
FIG. 7 is a schematic illustration depicting an alternative carrier phase recovery process, in accordance with an embodiment.

FIG. 7 is a schematic illustration depicting an alternative CPR process 700. CPR process 700 is similar in many respects to CPR process 400, FIG. 4, and performs carrier phase recovery and compensation on the respective polarizations of a dual-polarization carrier input signal 702 (i.e., 702(X) and 702(Y)) by a receiver processor (e.g., processor 102, FIG. 1). In the exemplary embodiments depicted in FIG. 7, CPR process 700 represents the implementation of the innovative and simplified algorithmic embodiments described above, but in this example, applied to a dual-polarized signal according to a differential modulation format, such as a DQPSK signal.

Similar to CPR process 400, CPR process 700 also implements only a single dynamic phase noise estimation unit 704, which may be similar in structure and function to dynamic phase noise estimation unit 404, FIG. 4. Also similar to unit 404, the phase noise estimation $\varphi_x(t)$ output from unit 704 is based only on a single polarization (i.e., the X-polarization signal, in this example) but shared with respective mixers 706 for both polarizations, that is, mixer 706(X) for the X-polarization and mixer 706(Y) for the Y-polarization. The phase recovery from both mixers 706(X), 706(Y) thus also utilizes the same function $e^{-j\varphi_x(t)}$ corresponding to the phase noise estimation value from unit 704.

However, for the exemplary embodiment depicted in FIG. 7, because dual-polarization carrier input signal 702 is a DQPSK signal, to implement the simplified DSP flow techniques described above, CPR process 700 implements only the dynamic phase noise estimation stage of processing, and may avoid the need for fixed phase rotation recovery for the polarization signals. Accordingly, in this example, CPR process 700 may employ an individual differential decoding unit 708 at the output of each mixer 706, respectively, to obtain the relevant output polarization signal 710. Accordingly, the person of ordinary skill the art can see that the complexity of DSP processing may be even further substantially reduced in the case of input carriers utilizing differential modulation formats.

FIGS. 8A-B are schematic illustrations depicting exemplary optical network architectures 800, 802, respectively. More particularly, optical network architecture 800 illustrates an exemplary implementation of the present DSP embodiments within a P2P configuration, and optical network architecture 802 illustrates an exemplary implementation of the present DSP embodiments within a P2MP configuration.

In an embodiment, P2P optical network architecture 800 includes a first transceiver 804 in operable communication with a second transceiver 806 over an optical communication transport medium 808. First transceiver 804 includes a first transmitter 810 and a first receiver 812, and second transceiver 806 includes a second receiver 814 and a second transmitter 816. In the exemplary embodiment, first receiver 812 includes a first DSP unit 818, and/or second receiver 814 includes a second DSP unit 820. In this exemplary P2P configuration, both of first and second receivers 812, 814 may be configured to operate as continuous mode coherent optical receivers, and either or both of first and second DSP units 818, 820 are configured to implement the reduced-complexity DSP flow techniques described above.

In contrast, P2MP optical network architecture 802 includes an upstream hub transceiver 822 (e.g., at a headend) in operable communication with a plurality (i.e., 1-k) of downstream transceivers 824 over an optical communication transport medium 826. Hub transceiver 822 includes a downstream transmitter 828 and an upstream receiver 830. In this exemplary P2MP configuration of architecture 802, each of downstream transceivers 824 may therefore include a respective downstream receiver 832 and an upstream transmitter 834. In an exemplary embodiment, one or more of downstream receivers 832 includes a respective downstream DSP unit 836, and upstream receiver 830 includes an upstream DSP unit 838. In an exemplary embodiment, some or all of upstream DSP unit 838 and downstream DSP units 836 are configured to implement the reduced-complexity DSP flow techniques described above. In an embodiment, downstream (DS) transmissions from downstream transmitter 828 to downstream receivers 832 may be sent as continuous mode coherent optical transmissions, and upstream (US) transmissions from respective upstream transmitters 834 to upstream receiver 830 may represent burst mode coherent optical transmissions.

FIG. 9 is a schematic illustration of an exemplary test architecture 900 for verifying experimental results implementing the receiver processing embodiments herein. More particularly, test architecture 900 was implemented in a real-world experimental setup to verify the proof of concept for the CPE and DSP flow systems and methods, as well as the several algorithmic blocks modules thereof, described above.

Test architecture 900 simulated a real-world operation of a coherent optics communication network, and included transmitter end 902 operably coupled to a receiver end 904 by an optical communication medium 906 (e.g., a 50-km single mode fiber (SMF), in this case). Transmitter end 902 included an arbitrary waveform generator (AWG) 908 (e.g., including an 80 GSa/s DAC), which generated of 25 GBaud polarization multiplexed QPSK and 16QAM signals 910. Signals 910 were modulated using an I/Q modulator 912 coupled with a laser source 914 (e.g., a laser diode, 100 kHz), and then amplified by amplifier 916 (e.g., a booster erbium-doped fiber amplifier (EDFA) for transmission over the 50-km SMF of medium 906.

At the receiver end 904, the power of the transmitted signal was measured after a variable optical attenuator (VOA) 918 deployed along medium 906 at an input of receiver end for coherent detection. The received signal was then amplified by a pre-EDFA 920, input to an integrated coherent receiver (ICR) 922 in operable communication with a local oscillator (LO) source 924, sampled by a digital sampling oscillator (DSO) 926 (e.g., also 80 GSa/s), and processed by a Matlab-capable computer (PC) 928. That is, in the actual experimental setup of test architecture 900, the several reduced-complexity algorithms, described above, for the receiver were implemented to demodulate the transmitted signal through a Matlab offline process employed by PC 928. In practical applications, such functionality may be performed within the coherent receiver itself, or by a DSP unit thereof. Results obtained from the experimental setup of test architecture 900 are described further below with respect to FIGS. 10A-11B.

FIG. 10A-B are graphical illustrations depicting experimental phase estimation measurement plots 1000, 1002, respectively, obtained according to test architecture 900, FIG. 9. More particularly, plots 1000, 1002 illustrate phase estimation results for both polarizations of a multi-symbol dual-polarization signal, as well as the comparative differences between the conventional approach (e.g., FIG. 3) and the reduced-complexity/simplified CPR systems and methods described herein (e.g., FIGS. 2, 4-7).

For example, plot 1000 illustrates the estimated phase-versus-symbol results according to the conventional technique that requires independent estimation of dynamic phase noise for each of the X- and Y-polarizations individually. As shown in plot 1000, an X-polarization phase subplot 1004 has the same phase evolution, but with a fixed phase offset, as a Y-polarization phase subplot 1006. That is, since the independent phase noise from fiber nonlinearity (e.g., from medium 906, FIG. 9) is considered to be relatively rather small at the transmission distances associated with the access paradigm, the respective phase noise in the two polarizations exhibits effectively the same behavior, except the fixed phase rotation.

In contrast, plot 1002 illustrates the estimated phase-versus-symbol results according to the CPR processing techniques described herein for the simplified DSP flow of a receiver processor. More particularly, a first subplot 1008 (solid line) illustrates the residual phase for one polarization using a dynamic phase estimation result, and a second subplot 1010 (dotted line) illustrates the results obtained using fixed phase rotation for the other polarization. As can be seen from the graphical illustration depicted in FIG. 10B, first and second subplots 1008, 1010 substantially align with one another, thereby demonstrating the particular effectiveness of embodiments according to the present systems and methods.

FIG. 11A-B are graphical illustrations depicting comparative BER performance result plots 1100, 1102, respectively, obtained according to test architecture 900, FIG. 9. More particularly, plot 1100, FIG. 11A illustrates a comparative BER-versus-symbol length overlay of a first subplot 1104 utilizing a training sequence-based fixed phase rotation estimation (e.g., FIG. 5) against a second subplot 1106 utilizing a BPS-based fixed phase rotation estimation (e.g., FIG. 6). As can be seen from the graphical illustration depicted in FIG. 11A, first and second subplots 1104, 1106 substantially align with one another. That is, BER performance is similar using either of the TS or blind estimation algorithms (in the condition of fixed receiver power at −38.3 dBm, for the experimental results of this example). As can also be seen from plot 1100, a converged result 1108 for fixed phase rotation estimation is obtained for a training sequence or average window size of 64 symbols.

In contrast, plot 1102 illustrates BER-versus-received optical power comparative overlays 1110, 1112 for a 100G QPSK signal and a 200G 16QAM signal, respectively. More particularly, comparative overlay 1110 superimposes a first subplot 1114 depicting the BER performance of the QPSK signal according to conventional CPR techniques (i.e., where both polarizations are independently subject to dynamic phase noise estimation) with a second subplot 1116 depicting the BER performance of the same QPSK signal according to the simplified CPR techniques described herein. Similarly, comparative overlay 1112 superimposes a third subplot 1118 depicting the BER performance of the 16QAM signal according to the conventional CPR techniques with a fourth subplot 1120 depicting the BER performance of the same 16QAM signal according to the present simplified CPR techniques. As can be seen from the optical power sensitivity comparisons of plot 1102, the innovative reduced-complexity DSP flow techniques of the present embodiments may be effectively implemented for different modulation formats with no significant or observable performance degradation therefrom.

The systems and methods described herein are therefore of particular advantageous use for the access network paradigm, for example, in the cable environment or other telecommunication applications, and may be implemented with respect to 4G, 5G, and 6G networks and related applications, as well as fronthaul, backhaul, and midhaul deployments, and also for both short- and long-haul architectures.

Exemplary embodiments of DSP systems and methods for digital and/or optical communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A digital receiver configured to process a polarization multiplexed carrier from a communication network, the polarization multiplexed carrier including a first polarization and a second polarization, the receiver comprising:

a first lane for transporting a first input signal of the first polarization;

a second lane for transporting a second input signal of the second polarization;

a dynamic phase noise estimation unit disposed within the first lane and configured to determine a phase estimate of the first input signal;

a first carrier phase recovery portion configured to perform phase recovery on the first polarization based on a combination of the first input signal and a function of the determined phase estimate of the first input signal; and a second carrier phase recovery portion comprising a fixed phase rotation estimation unit, wherein the second carrier phase recovery portion is configured to combine second input signal with the function of the determined phase estimate of the first input signal to form a combined second signal, and (ii) perform phase recovery on the combined second signal based on a phase rotation of the second polarization with respect to the first polarization.

2. The receiver of claim 1, wherein the first carrier phase recovery portion comprises a first mixer disposed in the first lane, wherein the second carrier phase recovery portion comprises a second mixer disposed in the second lane, and wherein the first and second mixers are each in operable communication with the dynamic phase noise estimation unit.

3. The receiver of claim 2, wherein the first mixer is configured to apply the determined phase estimate of the first input signal to the first polarization, and wherein second mixer is configured to apply the determined phase estimate of the first input signal to the second polarization.

4. The receiver of claim 3, wherein the fixed phase rotation estimation unit is disposed in the second lane and in operable communication with the second mixer.

5. The receiver of claim 4, wherein the fixed phase rotation estimation unit is configured to determine a fixed phase rotation of the combined second signal, output from the second mixer, of the second input signal and the function of the determined phase estimate of the first input signal.

6. The receiver of claim 5, wherein the second carrier phase recovery portion further comprises a third mixer disposed in the second lane and in operable communication with the second mixer and the fixed phase rotation estimation unit.

7. The receiver of claim 6, wherein the third mixer is configured to achieve phase recovery of the second polarization by combining an output of the second mixer with a function of the determined fixed phase rotation.

8. The receiver of claim 7, wherein the function of the determined fixed phase rotation comprises an estimated fixed phase offset rotation between the first and second polarizations.

9. The receiver of claim 5, wherein the fixed phase rotation estimation unit is configured to insert a training sequence into a series of signals of the second polarization.

10. The receiver of claim 9, wherein the training sequence is represented by Ts, wherein the fixed phase rotation of the second polarization is represented by $\varphi_0$, and wherein a series of received signals of the first polarization is defined as Rs, the fixed phase rotation of the second polarization is determined according to:

$$\varphi_0 = \text{avg}\left(\text{angle}\left(\frac{Rs}{Ts}\right)\right).$$

11. The receiver of claim 5, wherein the fixed phase rotation estimation unit is configured to perform a blind phase search based on an average of a series of signals of the second polarization.

12. The receiver of claim 3, wherein the first carrier phase recovery portion comprises a first differential decoding unit disposed in the first lane and in operable communication with the first mixer, and wherein the second carrier phase recovery portion comprises a second differential decoding unit disposed in the second lane and in operable communication with the second mixer.

13. The receiver of claim 12, wherein the polarization multiplexed carrier is a polarization multiplexed differential quadrature phase shift keying (PM-DQPSK) signal.

14. The receiver of claim 1, wherein the receiver is a coherent optics receiver.

15. A method of performing carrier phase recovery on a polarization multiplexed carrier in a digital signal processor of a coherent optics receiver, comprising steps of:
dynamically estimating phase noise of a first polarization direction of the polarization multiplexed carrier to generate a single-polarization phase estimate from the first polarization direction;
determining an estimated fixed phase offset rotation between the first and second polarization directions; and
performing phase recovery for a second polarization direction of the polarization multiplexed carrier based on the single-polarization phase estimate from the first polarization direction, and (ii) the determined estimated fixed phase offset rotation.

16. The method of claim 15, further comprising a step of performing phase recovery for the first polarization direction based on the single-polarization phase estimate from the first polarization direction.

17. The method of claim 16, wherein the step of performing phase recovery for the second polarization direction includes combining the estimated fixed phase offset rotation with the second polarization direction after the step of dynamically estimating the phase noise of the first polarization direction.

18. The method of claim 16, wherein the step of determining the estimated fixed phase offset rotation comprises at least one of a training sequence calculation, a data-aided calculation, and a blinded calculation.

19. The method of claim 16, further comprising the step of, after the steps of performing phase recovery for the first and second polarizations, differentially decoding the first and second polarizations.

* * * * *